(12) United States Patent
Gao et al.

(10) Patent No.: US 10,840,839 B1
(45) Date of Patent: Nov. 17, 2020

(54) METHOD AND SYSTEM FOR INDEPENDENT-SPEED-VARIABLE-FREQUENCY-GENERATOR-BASED POWER SYSTEM VOLTAGE REGULATION

(71) Applicant: The Boeing Company, Chicago, IL (US)

(72) Inventors: Lijun Gao, Renton, WA (US); Shengyi Liu, Sammamish, WA (US); Eugene Solodovnik, Kenmore, WA (US); Kamiar Karimi, Kirkland, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/590,157

(22) Filed: Oct. 1, 2019

(51) Int. Cl.
*H02P 9/42* (2006.01)

(52) U.S. Cl.
CPC .................................... *H02P 9/42* (2013.01)

(58) Field of Classification Search
CPC ......................................................... H02P 9/42
See application file for complete search history.

(56) References Cited

U.S. PATENT DOCUMENTS

| | | | | |
|---|---|---|---|---|
| 10,090,733 B2* | 10/2018 | De Wergifosse | ...... | B64D 15/12 |
| 10,622,931 B1* | 4/2020 | Gao | .......................... | H02P 9/14 |
| 2008/0042626 A1* | 2/2008 | Kamimura | .............. | H02P 9/105 322/25 |
| 2009/0322084 A1* | 12/2009 | Hamilton | .................. | H02P 9/04 290/44 |
| 2015/0219055 A1* | 8/2015 | Desabhatla | ............. | B60L 53/22 290/31 |
| 2017/0063265 A1* | 3/2017 | De Lamarre | ........... | H02P 9/305 |
| 2017/0170761 A1* | 6/2017 | Blackwelder | ............. | H02P 6/20 |
| 2017/0237373 A1* | 8/2017 | Tabuchi | .................. | H02P 9/302 322/79 |
| 2017/0271881 A1* | 9/2017 | Walters | .................... | H02P 9/307 |
| 2017/0346431 A1* | 11/2017 | Auer | ....................... | H02P 9/006 |

* cited by examiner

*Primary Examiner* — Viet P Nguyen
(74) *Attorney, Agent, or Firm* — Parsons Behle & Latimer

(57) ABSTRACT

A system may include an independent speed variable frequency (ISVF) generator and an excitation source configured to provide an excitation signal to rotor field windings of the ISVF generator to produce a rotating magnetic flux that is independent of a shaft speed of the ISVF generator. The system may include a bus configured to receive an output voltage of the ISVF generator. A generator control unit may be configured to generate a first excitation voltage reference component based on a shaft frequency of the ISVF generator, generate a second excitation voltage reference component based on a difference between a reference voltage and a measured output voltage of the ISVF generator, and generate an excitation voltage control signal based on a combination of the first excitation voltage reference component and the second excitation voltage reference component, the excitation voltage control signal usable to control a voltage magnitude of the excitation signal.

20 Claims, 6 Drawing Sheets

900 ⟶

902 — Experimentally determine a data set that maps shaft frequency values to excitation voltage references using an ISVF generator

FIG. 9

METHOD AND SYSTEM FOR INDEPENDENT-SPEED-VARIABLE-FREQUENCY-GENERATOR-BASED POWER SYSTEM VOLTAGE REGULATION

FIELD OF THE DISCLOSURE

This disclosure is generally related to the field of voltage regulation and, in particular, to independent speed variable frequency (ISVF) generator-based power system voltage regulation.

BACKGROUND

Voltage regulation may ensure that a power distribution system, such as within an aircraft or another vehicle, operates within defined limits, without disrupting or damaging any load equipment powered by the system. For example, some electronics electrically connected to the system may be susceptible to damage from power surges and other electrical phenomena. In aircraft industry, power distribution standards may be defined by various standards bodies. For example, standards for electrical power distribution in aircrafts may include DO-160 "Environmental Conditions and Test Procedures for Airborne Equipment" (Available from the Radio Technical Commission for Aeronautics in Washington, D.C., USA), MIL-STD-704 "Aircraft Electrical Power Characteristics" (Available from EverySpec.com in Gibsonia, Pa., USA), and others.

Unlike typical generators, an output voltage amplitude of an ISVF generator may be based on a combination of a first magnetic flux generated by rotation of a main field winding and a second magnetic flux generated by an excitation signal applied to the main field winding. The interaction of these two magnetic fields may result in voltage behaviors that differ from traditional generators. Because of the uniqueness of ISVF generators, typical methods of power regulation may not be sufficient to meet voltage regulation standards. For example, typical methods of power regulation may not consider a frequency and a phase angle of an excitation signal relative to a shaft speed.

SUMMARY

The disclosed examples describe a method and system to regulate the voltage of an ISVF generator-based power system while considering load disturbances, changes in an excitation signal, and shaft speed variations. In an example, a generator control unit apparatus includes a frequency-to-voltage converter configured to generate a first excitation voltage reference component based on a shaft frequency of an ISVF generator. The apparatus further includes a proportional-integral-derivative controller (PID) configured to generate a second excitation voltage reference component based on a difference between a reference voltage and a measured output voltage of the ISVF generator. The apparatus also includes an excitation source controller configured to generate an excitation voltage control signal based on a combination of the first excitation voltage reference component and the second excitation voltage reference component, the excitation voltage control signal usable to control a voltage magnitude of an excitation signal produced by an excitation source associated with the ISVF generator.

In some examples, the frequency-to-voltage converter includes a lookup table that maps shaft frequency values to excitation voltage references that, when applied to the ISVF generator, result in an output voltage at the ISVF generator that has a constant voltage magnitude for each of the shaft frequency values when the ISVF generator is in a no-load state. In some examples, the apparatus includes a difference circuit configured to generate an excitation frequency reference based on a reference frequency and the shaft frequency, where the excitation source controller is configured to generate an excitation frequency control signal based on the excitation frequency reference, the excitation frequency control signal usable to control a frequency of the excitation signal produced by the excitation source. In some examples, the excitation source controller is configured to generate an excitation phase angle control signal based on an excitation phase angle reference, the excitation phase angle control signal usable to control a phase angle of the excitation signal produced by the excitation source.

In some examples, the apparatus includes a root mean square (RMS) circuit configured to generate a magnitude of the measured output voltage of the ISVF generator and a difference circuit configured to generate the difference between the reference voltage and the measured output voltage based on the magnitude of the measured output voltage and the reference voltage. In some examples, the apparatus includes a multiplier circuit configured to generate the shaft frequency based on a shaft speed. In some examples, the ISVF generator is a multi-phase generator and the excitation signal includes multiple phases, where the multiple phases have an equal voltage magnitude that is based on the combination of the first excitation voltage reference component and the second excitation voltage reference component, where the multiple phases have an equal frequency that is based on an excitation frequency reference, and where the multiple phases have phase angles that are offset from each other by constant values.

In an example, a system includes an independent speed variable frequency (ISVF) generator. The system further includes an excitation source configured to provide an excitation signal to rotor field windings of the ISVF generator to produce a rotating magnetic flux that is independent of a shaft speed of the ISVF generator. The system also includes a bus configured to receive an output voltage of the ISVF generator. The system includes a generator control unit configured to generate a first excitation voltage reference component based on a shaft frequency of the ISVF generator. The generator control unit is further configured to generate a second excitation voltage reference component based on a difference between a reference voltage and a measured output voltage of the ISVF generator. The generator control unit is also configured to generate an excitation voltage control signal based on a combination of the first excitation voltage reference component and the second excitation voltage reference component, the excitation voltage control signal usable to control a voltage magnitude of the excitation signal.

In some examples, the generator control unit is further configured to determine the first excitation voltage reference component from the shaft frequency using a lookup table that maps shaft frequency values to excitation voltage references that, when applied to the ISVF generator, result in the output voltage at the ISVF generator having a constant magnitude for each of the shaft frequency values when the ISVF generator is in a no-load state. In some examples, the generator control unit is further configured to generate an excitation frequency reference based on a reference frequency and the shaft frequency and generate an excitation frequency control signal based on the excitation frequency reference, the excitation frequency control signal usable to control a frequency of the excitation signal.

In some examples, the generator control unit is configured to generate an excitation phase angle control signal based on an excitation phase angle reference, the excitation phase angle control signal usable to control a phase angle of the excitation signal. In some examples, the generator control unit is configured to generate a magnitude of the measured output voltage of the ISVF generator and generate the difference between the reference voltage and the measured output voltage based on the magnitude of the measured output voltage and the reference voltage. In some examples, the generator control unit is configured to generate the shaft frequency based on the shaft speed of the ISVF generator. In some examples, the ISVF generator is a multi-phase generator and the excitation signal includes multiple phases, the multiple phases have an equal voltage magnitude that is based on the combination of the first excitation voltage reference component and the second excitation voltage reference component, the multiple phases have an equal frequency that is based on an excitation frequency reference, and the multiple phases have phase angles that are offset from each other by constant values.

In an example, a method includes generating a first excitation voltage reference component based on a shaft frequency of an ISVF generator using a data set that maps shaft frequency values to excitation voltage references that, when applied to the ISVF generator, result in an output voltage at the ISVF generator that has a constant magnitude for each of the shaft frequency values when the ISVF generator is in a no-load state. The method further includes generating a second excitation voltage reference component based on a difference between a reference voltage and a measured output voltage of the ISVF generator. The method also includes generating an excitation voltage control signal based on a combination of the first excitation voltage reference component and the second excitation voltage reference component, the excitation voltage control signal usable to control a voltage magnitude of an excitation signal produced by an excitation source associated with the ISVF generator.

In some examples, the method includes experimentally determining the data set that maps the shaft frequency values to the excitation voltage references using the ISVF generator or a same type of ISVF generator. In some examples, the data set is a lookup table. In some examples, the method includes generating an excitation frequency reference based on a reference frequency and the shaft frequency and generating an excitation frequency control signal based on the excitation frequency reference, the excitation frequency control signal usable to control a frequency of the excitation signal. In some examples, the method includes generating an excitation phase angle control signal based on an excitation phase angle reference, the excitation phase angle control signal usable to control a phase angle of the excitation signal. In some examples, the method includes generating a magnitude of the measured output voltage of the ISVF generator and generating the difference between the reference voltage and the measured output voltage based on the magnitude of the measured output voltage and the reference voltage.

BRIEF DESCRIPTION OF THE DRAWINGS

FIG. 9 is a flow chart depicting an example of a method for generating a lookup table for voltage regulation.

Figure 1:
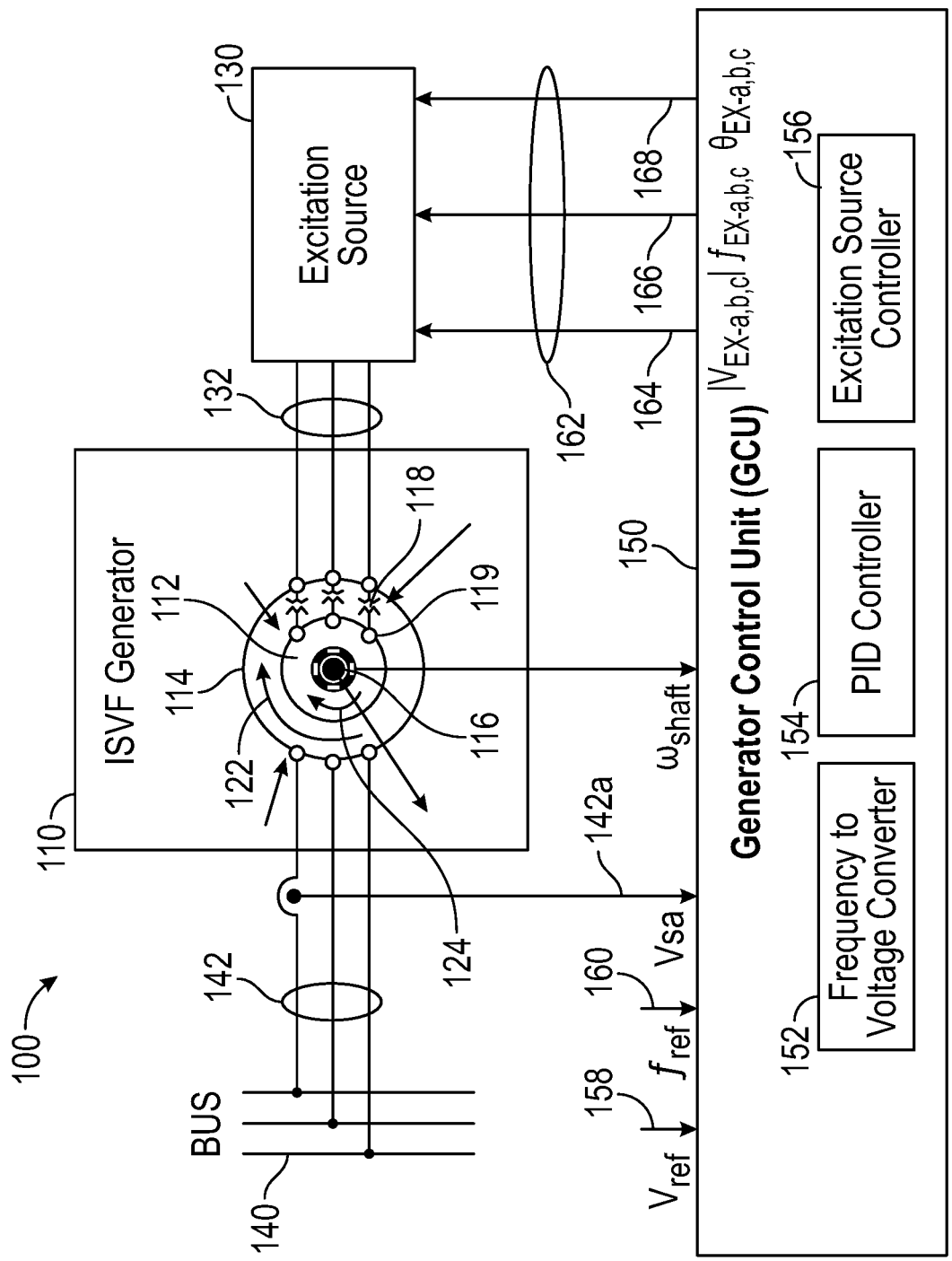
FIG. 1 is a block diagram depicting an example of an ISVF generator-based power system.

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an example of an ISVF generator-based power system 100 is depicted. The system 100 may include an ISVF generator 110. The ISVF generator 110 may include a rotor 112 and a stator 114. The rotor may be fixed to a shaft 116. During operation of the ISVF generator 110, an excitation signal 132 may be transmitted from the stator 114 to the rotor 112 via a set of high frequency transformers 118. The excitation signal 132 may be used to generate a rotating magnetic flux 122 around the rotor 112 that rotates independently of a shaft speed 124. In this way, a frequency of an output voltage 142 of the ISVF generator 110 may be independent of the shaft speed 124. A non-limiting example of the ISVF generator 110 is described in U.S. patent application Ser. No. 15/819,919, filed on Nov. 21, 2017, published as U.S. Patent App. Publication No. 2019/0158002, and entitled "Independent Speed Variable Frequency Alternating Current Generator," the contents of which are hereby incorporated by reference herein in their entirety.

As depicted in FIG. 1, the ISVF generator 110 may be a multi-phase generator (e.g., a three-phase generator). In that case, the excitation signal 132 may include multiple three phases. Likewise, the output voltage 142 may include three phases. While FIG. 1 depicts three-phases, the ISVF generator 110 may be configured to produce more or fewer than three phases.

The system 100 may further include an excitation source 130 configured to provide the excitation signal 132 to field windings 119 of the rotor 112 of the ISVF generator 110 to produce the rotating magnetic flux 122. A frequency and magnitude of the rotating magnetic flux 122 may be directly dependent on a frequency and magnitude of the excitation signal 132. In order to ensure that the output voltage 142 of the ISVF generator 110 has a constant frequency, the frequency of the excitation signal 132 may increase and decrease inversely to a frequency of the shaft 116. For example, if a desired frequency of the output voltage 142 is 400 Hz and a frequency of the shaft 116 is also 400 Hz, then the frequency of the rotating magnetic flux 122 would be zero. In other words, the shaft alone can produce the entire desired frequency independent of the rotating magnetic flux 122. If, however, a frequency of the shaft 116 is 500 Hz, then, in order to produce the output voltage 142 with a frequency of 400 Hz, the rotating magnetic flux 122 and its corresponding excitation signal 132 may have a frequency of negative −100 Hz. The relationship between a frequency of the excitation signal 132 and a frequency of the shaft 116 is further described with reference to FIG. 6.

A magnitude of the output voltage 142 may be based on a combination of power produced by the rotation of the shaft 116 and power produced by the rotating magnetic flux 122. When a frequency of the shaft 116 is operating at the desired frequency (e.g., 400 Hz), the majority of power may be generated via the rotation of the shaft 116. In order to produce a desired magnitude of the output voltage 142, a voltage of the excitation signal 132 may be comparatively low (relying on the rotation of the shaft 116 to produce the power). When a frequency of the shaft 116 is higher or lower than the desired frequency, more power may be generated via the rotating magnetic flux 122. In that case, a voltage of the excitation signal may be comparatively high in order to maintain a desired output voltage level. The role that the voltage of the excitation signal plays in maintaining a constant magnitude of the output voltage 142 is further described with reference to FIG. 7.

A bus 140 may be configured to receive the output voltage 142 of the ISVF generator 110. The bus 140 may form part of a power distribution system. In some examples, the power distribution system may provide power to systems of a vehicle, such as an aircraft. Due to the sensitive nature of circuitry that may be coupled to the bus 140, it may be desirable to regulate the output voltage 142 as described herein.

The system 100 may include a generator control unit (GCU) 150 including a frequency-to-voltage converter 152, a proportional-integral-derivative (PID) controller 154, and an excitation source controller 156. The frequency-to-voltage converter 152 may be configured to generate a first excitation voltage reference component based on a shaft frequency derived from the shaft speed 124 of the ISVF generator 110. The first excitation voltage reference component may be usable to ensure that the output voltage 142 is constant in a no-load condition. The PID controller 154 may be configured to generate a second excitation voltage reference component based on a difference between a reference voltage 158 and a measured output voltage 142a (e.g., a single phase of the output voltage 142 of the ISVF generator 110. The second excitation component may be usable to compensate for the effect of varying loads on the output voltage 142. Based on a combination of the first excitation voltage reference component and the second excitation voltage reference component, the excitation source controller 156 may generate an excitation voltage control signal 164. The excitation voltage control signal 164 may be usable to control a voltage magnitude of the excitation signal 132. The excitation source controller 156 may also generate an excitation frequency control signal 166, which may be based on a reference frequency 160, and an excitation phase angle control signal 168. The excitation voltage control signal 164, the excitation frequency control signal 166, and the excitation phase angle control signal 168 may, together, make up an excitation source control signal 162.

As described herein, the generator control unit 150 may be configured to determine the first excitation voltage reference component from the shaft frequency using a lookup table that maps shaft frequency values to excitation voltage references that, when applied to the ISVF generator 110 result in the output voltage 142 at the ISVF generator 110 having a constant magnitude for each of the shaft frequency values when the ISVF generator 110 is in a no-load state.

A benefit of the system 100 is that the frequency-to-voltage converter 152 may enable the generator control unit 150 to control an excitation signal 132 to maintain a constant amplitude and frequency of the output voltage 142 in a no-load condition. The PID controller 154 may then fine tune the excitation signal 132 to compensate for varying loads applied by devices attached to the bus 140. Other benefits may exist.

Figure 2:
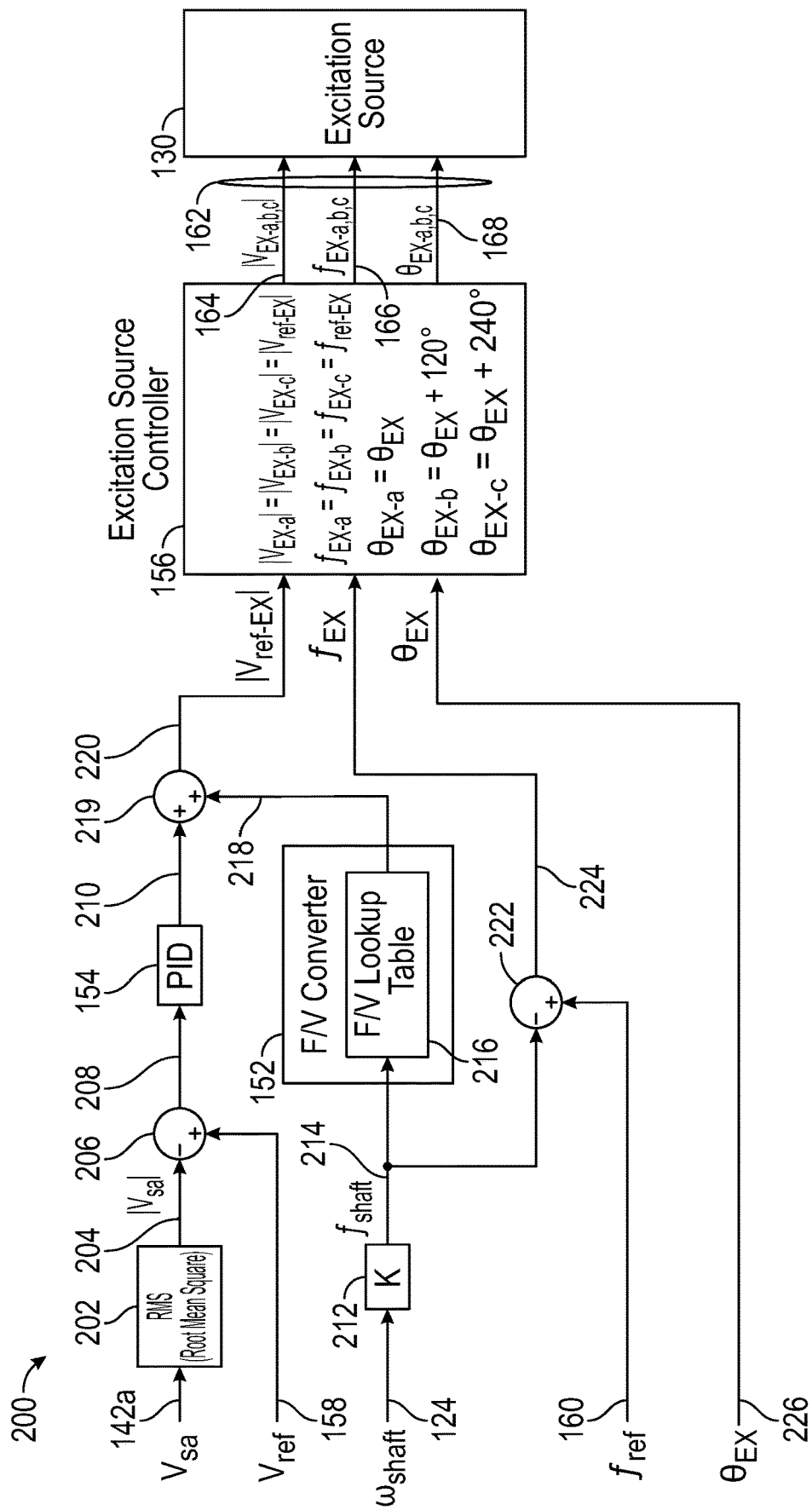
FIG. 2 is a functional block diagram depicting an example of a generator control system for an ISVF generator-based power system.

Referring to FIG. 2, an example of a generator control system 200 for an ISVF generator-based power system is depicted. The generator control system 200 may correspond to the generator control unit 150 of FIG. 1. Although the system 200 is depicted as discrete modules, the one or more of the modules may be combined. Further, the system 200 may be implemented as hardware or software, depending on a particular application. In some examples, each of the functions described with reference to FIG. 2 may be stored in a memory device and may be performed or initiated by a processor.

The system 200 may include a multiplier circuit 212 configured to generate a shaft frequency 214 (i.e., $f_{shaft}$) based on the shaft speed 124 (i.e., $\omega_{shaft}$). The frequency-to-voltage converter 152 may then convert the shaft frequency 214 into a first excitation voltage reference component 218. In some examples, the frequency-to-voltage converter 152 includes a frequency-to-voltage (F/V) lookup table 216. The lookup table 216 maps shaft frequency values to excitation voltage references that, when applied to the ISVF generator 110, result in the output voltage 142 at the ISVF generator 110 having a constant voltage magnitude for each of the shaft frequency values when the ISVF generator 110 is in a no-load state. In other words, the lookup table 216 may indicate what voltage the excitation voltage control signal 164 should have to ensure a that the output voltage 142 of the ISVF generator 110 is constant.

The system 200 may include a root mean square (RMS) circuit 202 configured to generate a magnitude 204 (i.e., $|V_{sa}|$) of the measured output voltage 142a (i.e., $V_{sa}$) of the ISVF generator 110. In some examples, the measured output voltage 142a (i.e., $V_{sa}$) may correspond to a single phase of a multiphase output. A first difference circuit 206 may be configured to generate a difference 208 between the reference voltage 158 (i.e., $V_{ref}$) and the measured output voltage 142a based on the magnitude 204 (i.e., $|V_{sa}|$) of the measured output voltage 142a (i.e., $V_{sa}$). A PID controller 154 may be configured to generate a second excitation voltage reference component 210 based on the difference 208.

The first excitation voltage reference component 218 may be usable to ensure that the output voltage 142 is constant in a no-load condition. The second excitation voltage reference component 210 may be usable to compensate for the effect of varying loads. A summing circuit 219 may be configured to generate a combination 220 (i.e., $V_{ref-EX}$) of the first excitation voltage reference component 218 and the second excitation voltage reference component 210. The excitation source controller 156 may use the combination 220 to generate an excitation voltage control signal 164 that is usable to control a voltage magnitude of the excitation signal 132 depicted in FIG. 1. As shown in FIG. 2, for a three-phase system, the magnitude of each phase $|V_{EX-a}|$, $|V_{EX-a}|$, $|V_{EX-a}|$ of the excitation voltage control signal 164 may be equal to the combination 220 (i.e., $|V_{ref-EX}|$).

The system 200 may include a second difference circuit 222 configured to receive the shaft frequency 214 and the reference frequency 160 and to calculate a difference between them, resulting in an excitation frequency reference 224 (i.e., $f_{EX}$). An excitation frequency control signal 166 may be generated by the excitation source controller 156 based on the excitation frequency reference 224. The excitation frequency control signal 166 may be usable to control a frequency of the excitation signal 132. As shown in FIG. 2, for a three-phase system, the frequency of each phase |$f_{EX\text{-}a}$|, |$f_{EX\text{-}a}$|, $f_{EX\text{-}a}$| of the excitation frequency control signal 166 may be equal to the excitation frequency reference 224 (i.e., $f_{EX}$).

The excitation source controller 156 may be configured to generate an excitation phase angle control signal 168 based on an excitation phase angle reference 226 (i.e., $\theta_{EX}$). The excitation phase angle control signal 168 may be usable to control a phase angle of the excitation signal 132 produced by the excitation source 130. For a multiphase system, the multiple phases ($\theta_{EX\text{-}a}$, $\theta_{EX\text{-}b}$, $\theta_{EX\text{-}c}$) may have phase angles that are offset from each other by constant values (i.e., 120°, 240°).

Figure 3:
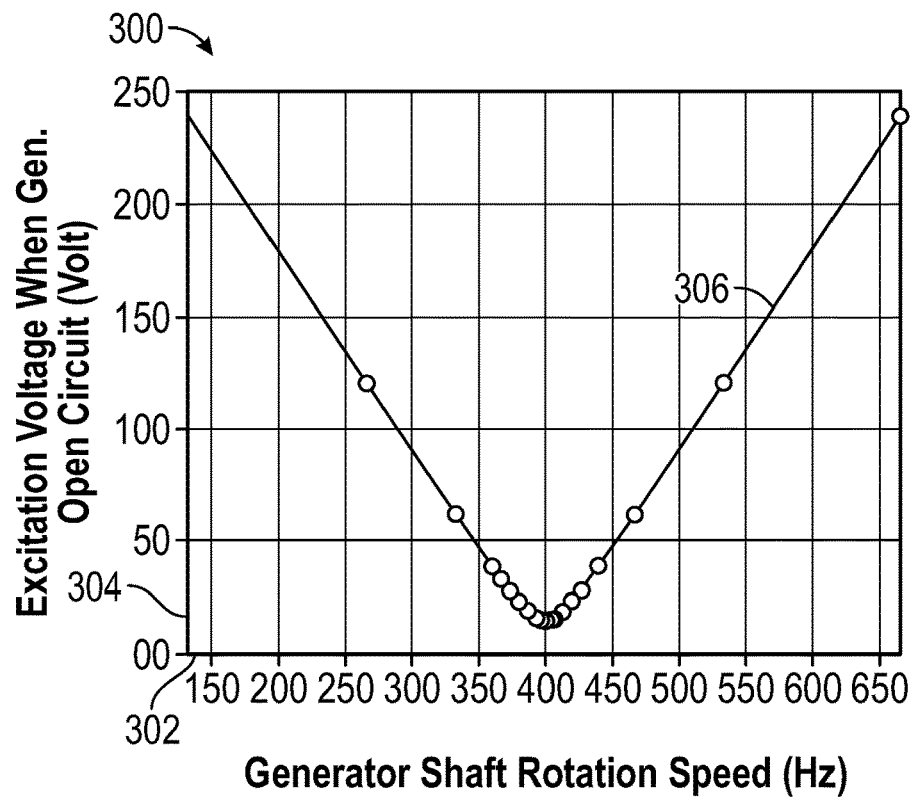
FIG. 3 is a graph depicting a function that maps shaft frequency values to excitation voltage reference values.

Referring to FIG. 3, a graph 300 depicts shaft frequency values 302 along an x-axis and excitation voltage reference values 304 along a y-axis. A function 306 maps the shaft frequency values 302 to the excitation voltage reference values 304 such that the resultant excitation voltage reference values 304, when applied to the ISVF generator 110, result in an output voltage at the ISVF generator 110 that has a constant voltage magnitude for each of the shaft frequency values 302 when the ISVF generator 110 is in a no-load state. The data in the graph 300 may be determined experimentally and may vary between different ISVF generators. Further, the data may correspond to a particular desired output frequency. In the example of FIG. 3, the desired output frequency is 400 Hz.

The data shown in the graph 300 may be incorporated into the lookup table 216 of FIG. 2, or otherwise used to determine the first excitation voltage reference component 218. While the PID controller 154 may be sufficient to make minor adjustments to the excitation voltage control signal 164, as the data in the graph 300 shows, major adjustments may be made in the excitation voltage control signal 164 based on the shaft frequency 214 depicted in FIG. 2. Because these changes are predictable, it may be more efficient to use the lookup table 216 to generate the first excitation voltage reference component 218 rather than relying on the PID controller 154. The PID controller 154 may then be used to make minor adjustments to compensate for loaded conditions.

Figure 4:
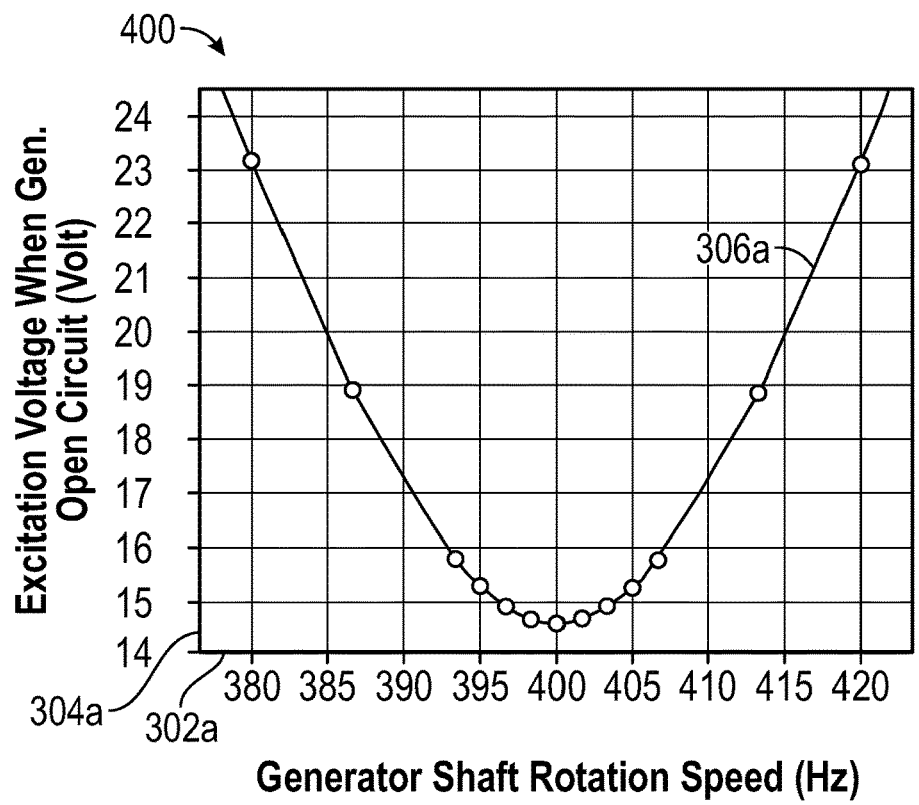
FIG. 4 is a graph depicting a portion of the function of FIG. 3 that maps shaft frequency values to excitation voltage reference values.

Referring to FIG. 4, a graph 400 depicts a zoomed portion of the graph 300. For example, the graph 400 depicts shaft frequency values 302a along an x-axis and excitation voltage reference values 304a along a y-axis, with a function 306a that maps the shaft frequency values 302a to the excitation voltage reference values 304a. Applying FIG. 4 to FIGS. 1 and 2, when the shaft frequency 214 is at 400 Hz, the excitation signal 132 supplied to the ISVF generator may be zero. In this state, the majority of power may be generated by the rotation of the shaft 116 as opposed to the excitation signal 132. Thus, in order to maintain a constant output voltage 142, a voltage of the excitation signal 132 may be minimal at 400 Hz. As the shaft frequency 214 moves away from 400 Hz, more of the output voltage of the ISVF generator 110 may be derived from the excitation signal 132. Thus, in order to maintain a constant output voltage 142, a voltage of the excitation signal 132 is increased.

Figure 5:
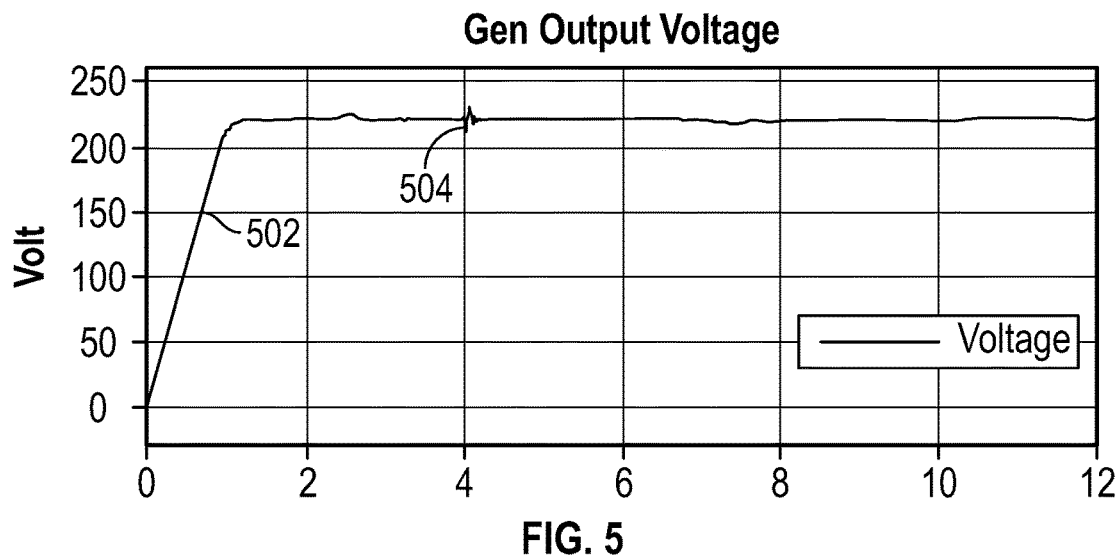
FIG. 5 is a graph depicting a simulated generator output voltage over time.
Figure 6:
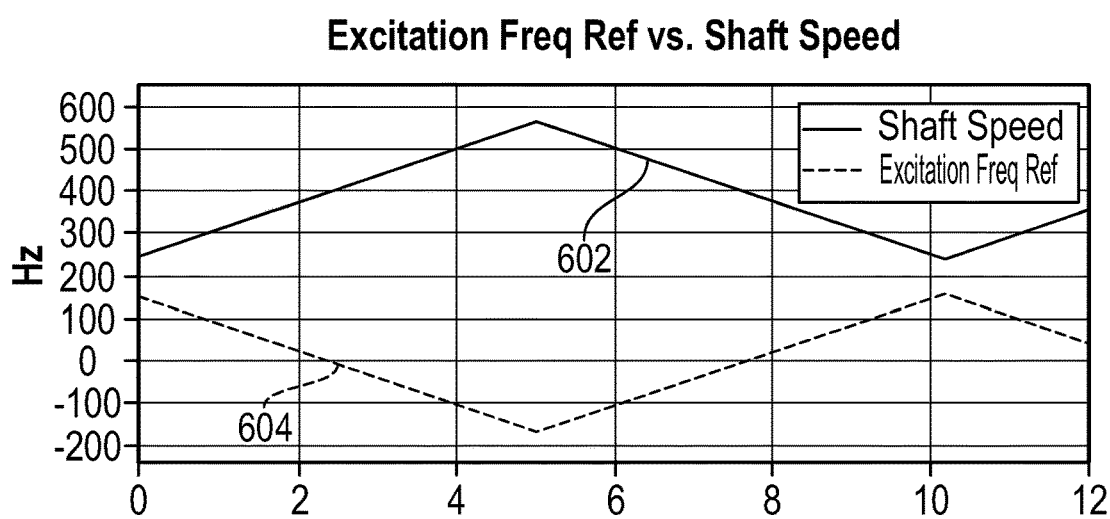
FIG. 6 is a graph depicting a simulated shaft speed and an excitation frequency reference over time.
Figure 7:
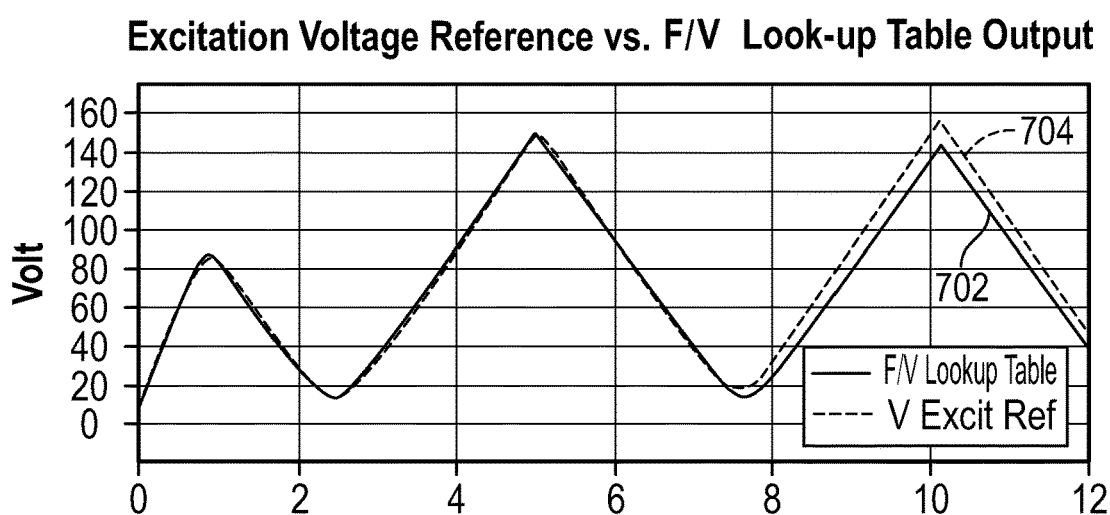
FIG. 7 is a graph depicting a simulated excitation voltage reference and an excitation voltage reference value that is based on an output of the frequency-to-voltage converter.

Referring to FIGS. 5-7, simulation results of an ISVF generator-based power system are depicted over time. FIG. 5 depicts a simulated generator output voltage 502 over time. FIG. 6 depicts a simulated shaft speed 602 and an excitation frequency reference 604 over time. FIG. 7 depicts a simulated excitation voltage reference 704 and an excitation voltage reference value 702 that is based on an output of the frequency-to-voltage converter 152.

The simulation of FIGS. 5-7 may correspond to a generator output frequency of 400 Hz, and a line-to-neutral voltage root-mean square (RMS) value of 220V. As shown in FIG. 6, the simulated shaft speed changes from 240 Hz at t=0 to 560 Hz at t=4.5, then back to 240 Hz at t=10. At t=4, 50% of a rated load is applied as can be seen by the small disturbance 504 in the output voltage 502 of FIG. 5.

FIG. 5 shows a generator output voltage 502 RMS value. The generator output voltage 502 increased from 0 and stabilizes at 220 V at about 1 second. At T=4, a 50% load is applied, and the output voltage 502 passes through a dynamic transient and keeps at 220V. At T=2.5 and T=7.5, the output voltage 502 shows a small amplitude variation. This variation is due to the shaft speed equaling 400 Hz at those times. When the shaft speed is at 400 Hz, a small voltage amplitude change in an excitation signal may cause a large deviation at a generator output voltage.

FIG. 6 shows the shaft speed 602 and the excitation frequency reference 604 for the excitation source. The sum of the two values equals 400 Hz, which corresponds to the desired generator output frequency.

FIG. 7 shows a simulated excitation voltage reference 704 and an excitation voltage reference value 702 that is based on an output of the frequency-to-voltage converter 152. Applying FIG. 7 to FIG. 2, the excitation voltage reference value 702 may correspond to the first excitation voltage reference component 218, while the excitation voltage reference value 704 may correspond to the combination 220 of the first excitation voltage reference component 218 and the second excitation voltage reference component 210. The difference between the two curves may be due to the PID output, which compensates the voltage drops due to a load change.

Figure 8:
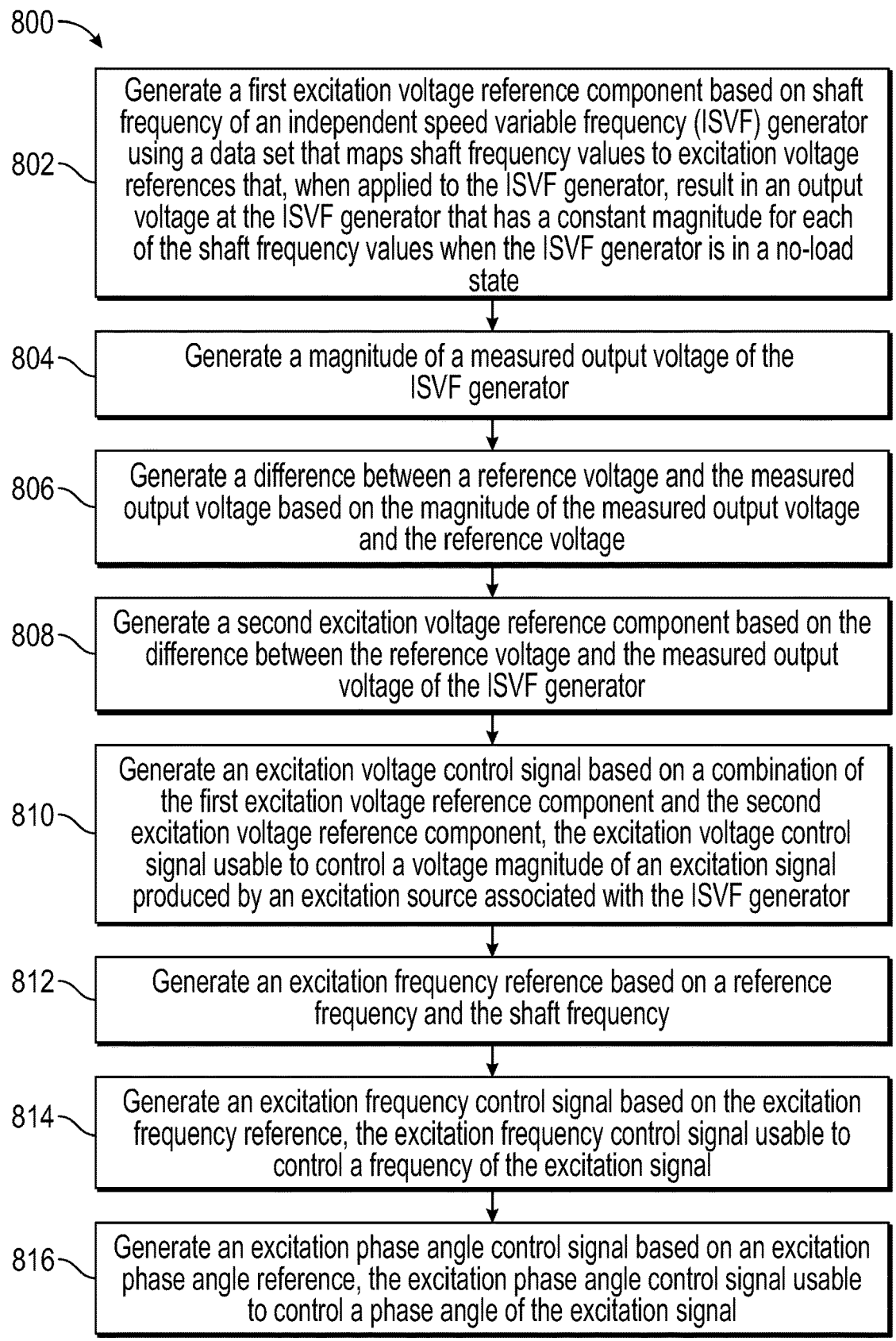
FIG. 8 is a flow chart depicting an example of a method for voltage regulation.

Referring to FIG. 8, a flow chart depicts an example of a method 800 for voltage regulation. The method 800 may include generating a first excitation voltage reference component based on a shaft frequency of an ISVF generator using a data set that maps shaft frequency values to excitation voltage references that, when applied to the ISVF generator, result in an output voltage at the ISVF generator that has a constant magnitude for each of the shaft frequency values when the ISVF generator is in a no-load state, at 802. For example, the first excitation voltage reference component 218 may be generated by the frequency-to-voltage converter 152 using the lookup table 216.

The method 800 may further include generating a magnitude of a measured output voltage of the ISVF generator, at 804. For example, the magnitude 204 may be generated by the RMS circuit 202.

The method 800 may also include generating a difference between a reference voltage and the measured output voltage based on the magnitude of the measured output voltage and the reference voltage, at 806. For example, the first difference circuit 206 may generate the difference 208 between the reference voltage 158 and the measured output voltage 142a based on the magnitude 204.

The method 800 may include generating a second excitation voltage reference component based on the difference between the reference voltage and the measured output voltage of the ISVF generator, at 808. For example, the PID controller 154 may generate the second excitation voltage reference component 210.

The method 800 may further include generating an excitation voltage control signal based on a combination of the first excitation voltage reference component and the second excitation voltage reference component, the excitation voltage control signal usable to control a voltage magnitude of an excitation signal produced by an excitation source associated with the ISVF generator, at 810. For example, the excitation source controller 156 may generate the excitation voltage control signal 164 based on the combination 220 of the first excitation voltage reference component 218 and the second excitation voltage reference component 210.

The method 800 may also include generating an excitation frequency reference based on a reference frequency and the shaft frequency, at 812. For example, the second difference circuit 222 may generate the excitation frequency reference 224 based on the reference frequency 160 and the shaft frequency 214.

The method 800 may include generating an excitation frequency control signal based on the excitation frequency reference, the excitation frequency control signal usable to control a frequency of the excitation signal, at 814. For example, the excitation source controller 156 may generate the excitation frequency control signal 166 based on the excitation frequency reference 224.

The method 800 may further include generating an excitation phase angle control signal based on an excitation phase angle reference, the excitation phase angle control signal usable to control a phase angle of the excitation signal, at 816. For example, the excitation source controller 156 may generate the excitation phase angle control signal 168 based on the excitation phase angle reference 226.

Referring to FIG. 9, a flow chart depicts an example of a method 900 for generating a lookup table for voltage regulation. The method 900 may include experimentally determining a data set that maps shaft frequency values to excitation voltage references using an ISVF generator, at 902. For example, the data depicted in FIGS. 3 and 4 may be experimentally determined.

Although various examples have been shown and described, the present disclosure is not so limited and will be understood to include all such modifications and variations as would be apparent to one skilled in the art.

What is claimed is:

1. A generator control unit apparatus comprising:
   a frequency-to-voltage converter configured to generate a first excitation voltage reference component based on a shaft frequency of an independent speed variable frequency (ISVF) generator;
   a proportional-integral-derivative (PID) controller configured to generate a second excitation voltage reference component based on a difference between a reference voltage and a measured output voltage of the ISVF generator; and
   an excitation source controller configured to generate an excitation voltage control signal based on a combination of the first excitation voltage reference component and the second excitation voltage reference component, the excitation voltage control signal usable to control a voltage magnitude of an excitation signal produced by an excitation source associated with the ISVF generator.

2. The apparatus of claim 1, wherein the frequency-to-voltage converter comprises a lookup table that maps shaft frequency values to excitation voltage reference values that, when applied to the ISVF generator, result in an output voltage at the ISVF generator that has a constant voltage magnitude for each of the shaft frequency values when the ISVF generator is in a no-load state.

3. The apparatus of claim 1, further comprising:
   a difference circuit configured to generate an excitation frequency reference based on a reference frequency and the shaft frequency, wherein the excitation source controller is configured to generate an excitation frequency control signal based on the excitation frequency reference, the excitation frequency control signal usable to control a frequency of the excitation signal produced by the excitation source.

4. The apparatus of claim 1, wherein the excitation source controller is configured to generate an excitation phase angle control signal based on an excitation phase angle reference, the excitation phase angle control signal usable to control a phase angle of the excitation signal produced by the excitation source.

5. The apparatus of claim 1, further comprising:
   a root mean square (RMS) circuit configured to generate a magnitude of the measured output voltage of the ISVF generator; and
   a difference circuit configured to generate the difference between the reference voltage and the measured output voltage based on the magnitude of the measured output voltage and the reference voltage.

6. The apparatus of claim 1, further comprising:
   a multiplier circuit configured to generate the shaft frequency based on a shaft speed.

7. The apparatus of claim 1, wherein the ISVF generator is a multi-phase generator and the excitation signal includes multiple phases, wherein the multiple phases have an equal voltage magnitude that is based on the combination of the first excitation voltage reference component and the second excitation voltage reference component, wherein the multiple phases have an equal frequency that is based on an excitation frequency reference, and wherein the multiple phases have phase angles that are offset from each other by constant values.

8. A system comprising:
   an independent speed variable frequency (ISVF) generator;
   an excitation source configured to provide an excitation signal to field windings of a rotor of the ISVF generator to produce a rotating magnetic flux that is independent of a shaft speed of the ISVF generator;
   a bus configured to receive an output voltage of the ISVF generator; and
   a generator control unit configured to:
      generate a first excitation voltage reference component based on a shaft frequency of the ISVF generator;
      generate a second excitation voltage reference component based on a difference between a reference voltage and a measured output voltage of the ISVF generator; and
      generate an excitation voltage control signal based on a combination of the first excitation voltage reference component and the second excitation voltage reference component, the excitation voltage control signal usable to control a voltage magnitude of the excitation signal.

9. The system of claim 8, wherein the generator control unit is further configured to:
   determine the first excitation voltage reference component from the shaft frequency using a lookup table that maps shaft frequency values to excitation voltage reference values that, when applied to the ISVF generator, result in the output voltage at the ISVF generator having a constant magnitude for each of the shaft frequency values when the ISVF generator is in a no-load state.

10. The system of claim 8, wherein the generator control unit is further configured to:
generate an excitation frequency reference based on a reference frequency and the shaft frequency; and
generate an excitation frequency control signal based on the excitation frequency reference, the excitation frequency control signal usable to control a frequency of the excitation signal.

11. The system of claim 8, wherein the generator control unit is further configured to:
generate an excitation phase angle control signal based on an excitation phase angle reference, the excitation phase angle control signal usable to control a phase angle of the excitation signal.

12. The system of claim 8, wherein the generator control unit is further configured to:
generate a magnitude of the measured output voltage of the ISVF generator; and
generate the difference between the reference voltage and the measured output voltage based on the magnitude of the measured output voltage and the reference voltage.

13. The system of claim 8, wherein the generator control unit is further configured to:
generate the shaft frequency based on the shaft speed of the ISVF generator.

14. The system of claim 8, wherein the ISVF generator is a multi-phase generator and the excitation signal includes multiple phases, wherein the multiple phases have an equal voltage magnitude that is based on the combination of the first excitation voltage reference component and the second excitation voltage reference component, wherein the multiple phases have an equal frequency that is based on an excitation frequency reference, and wherein the multiple phases have phase angles that are offset from each other by constant values.

15. A method comprising:
generating a first excitation voltage reference component based on a shaft frequency of an independent speed variable frequency (ISVF) generator using a data set that maps shaft frequency values to excitation voltage reference values that, when applied to the ISVF generator, result in an output voltage at the ISVF generator that has a constant magnitude for each of the shaft frequency values when the ISVF generator is in a no-load state;
generating a second excitation voltage reference component based on a difference between a reference voltage and a measured output voltage of the ISVF generator; and
generating an excitation voltage control signal based on a combination of the first excitation voltage reference component and the second excitation voltage reference component, the excitation voltage control signal usable to control a voltage magnitude of an excitation signal produced by an excitation source associated with the ISVF generator.

16. The method of claim 15, further comprising:
experimentally determining the data set that maps the shaft frequency values to the excitation voltage references using the ISVF generator or a same type of ISVF generator.

17. The method of claim 15, wherein the data set is a lookup table.

18. The method of claim 15, further comprising:
generating an excitation frequency reference based on a reference frequency and the shaft frequency; and
generating an excitation frequency control signal based on the excitation frequency reference, the excitation frequency control signal usable to control a frequency of the excitation signal.

19. The method of claim 15, further comprising:
generating an excitation phase angle control signal based on an excitation phase angle reference, the excitation phase angle control signal usable to control a phase angle of the excitation signal.

20. The method of claim 15, further comprising:
generating a magnitude of the measured output voltage of the ISVF generator; and
generating the difference between the reference voltage and the measured output voltage based on the magnitude of the measured output voltage and the reference voltage.

* * * * *